Dec. 28, 1965  S. BECKWITH  3,226,582
ADJUSTABLE TORQUE INDUCTION MOTORS
Filed Sept. 12, 1962  4 Sheets-Sheet 2
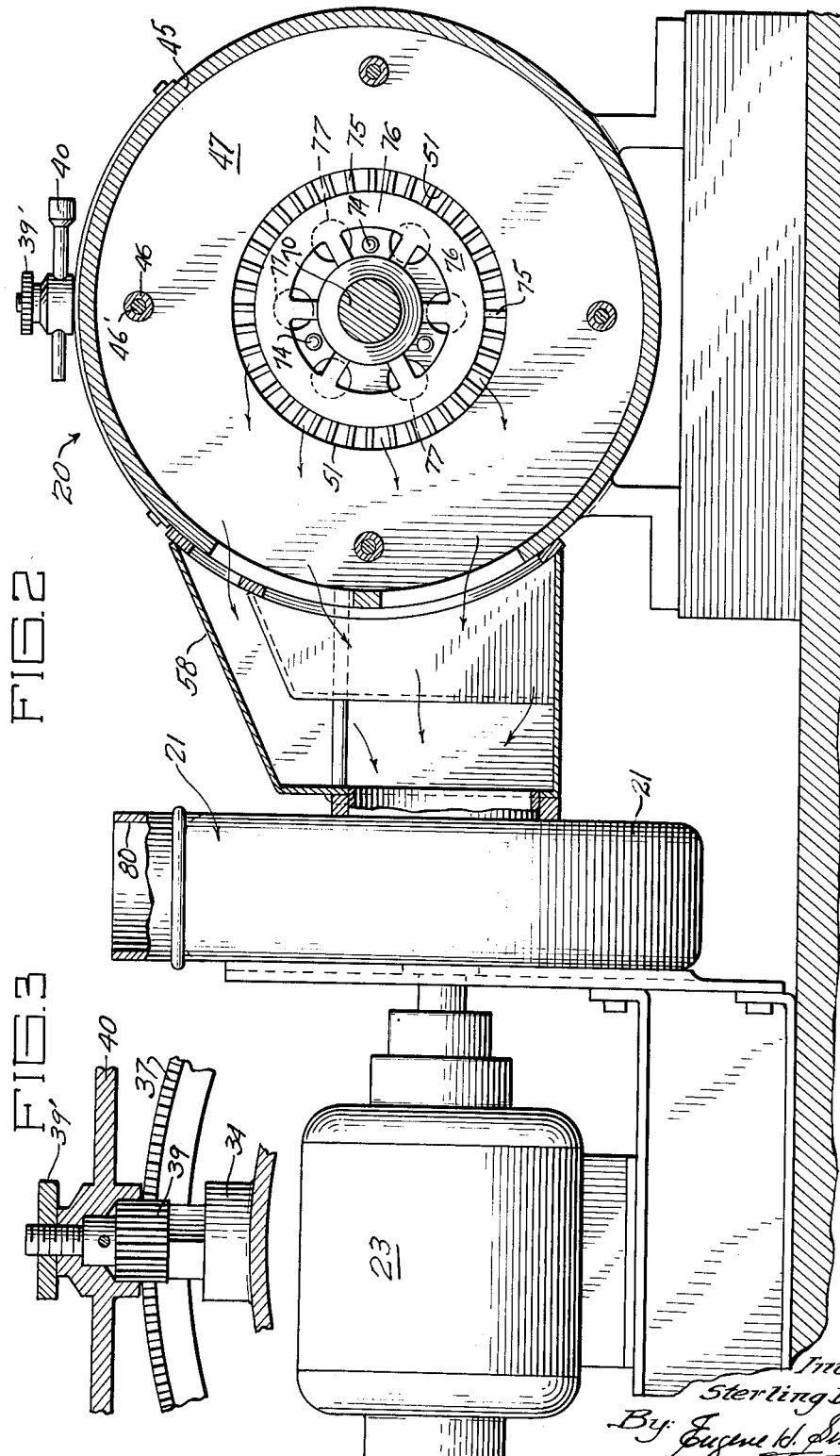
Inventor:
Sterling Beckwith
By: Eugene W. Simpson
Attorney

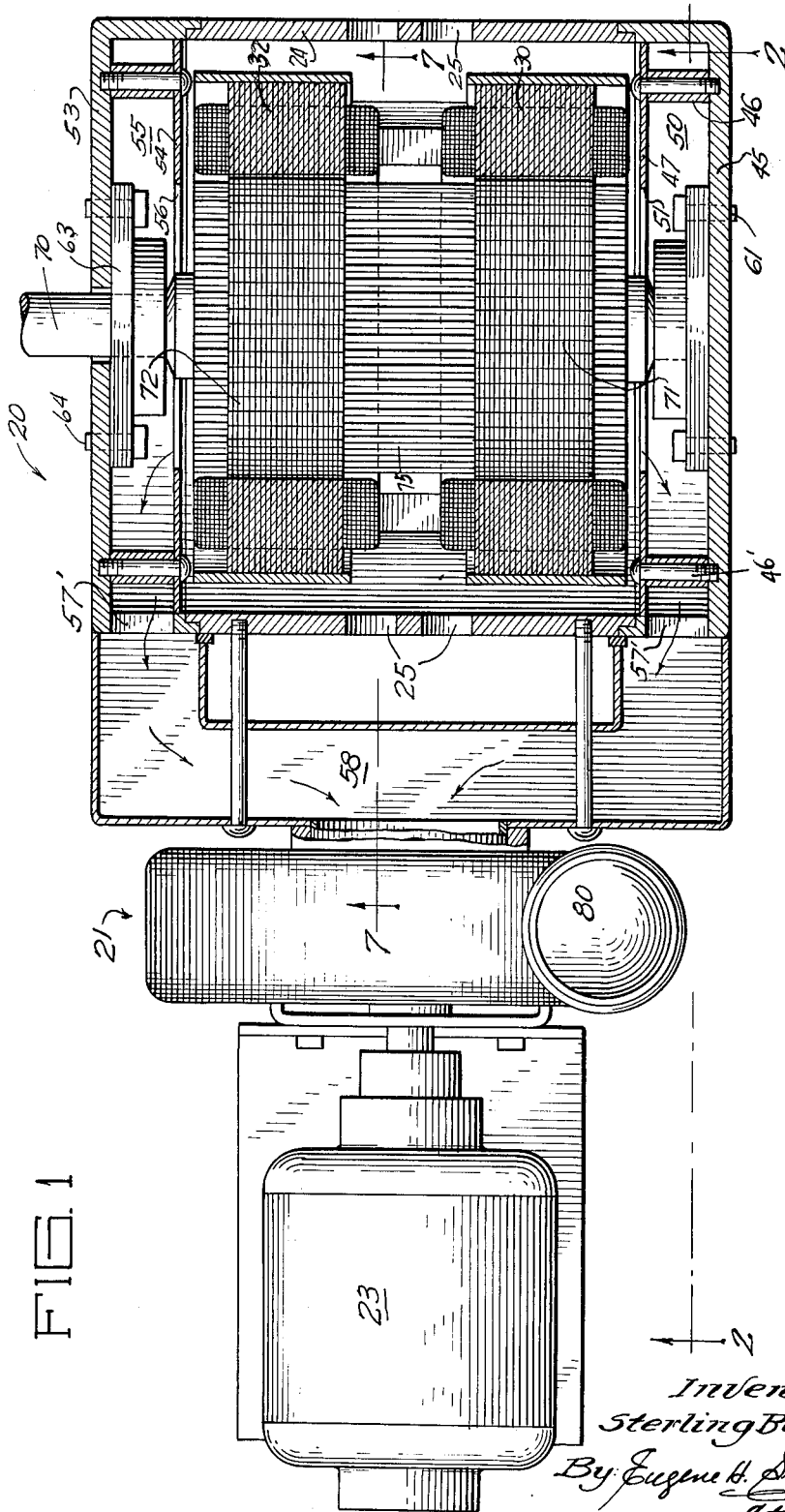

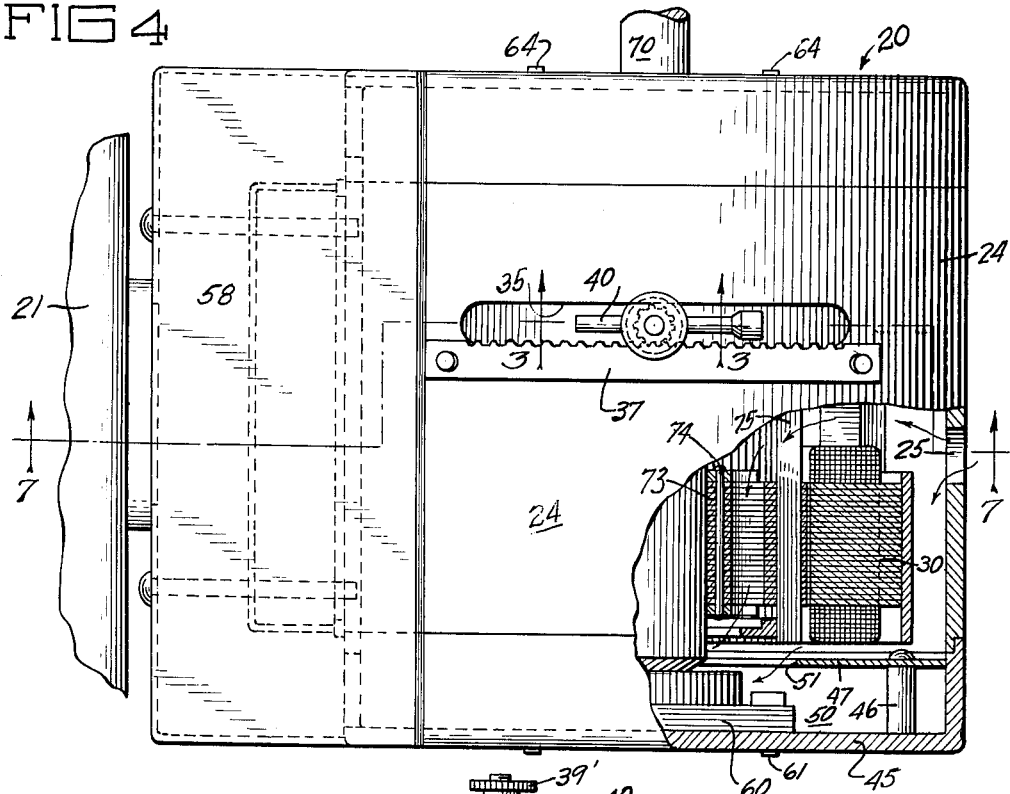
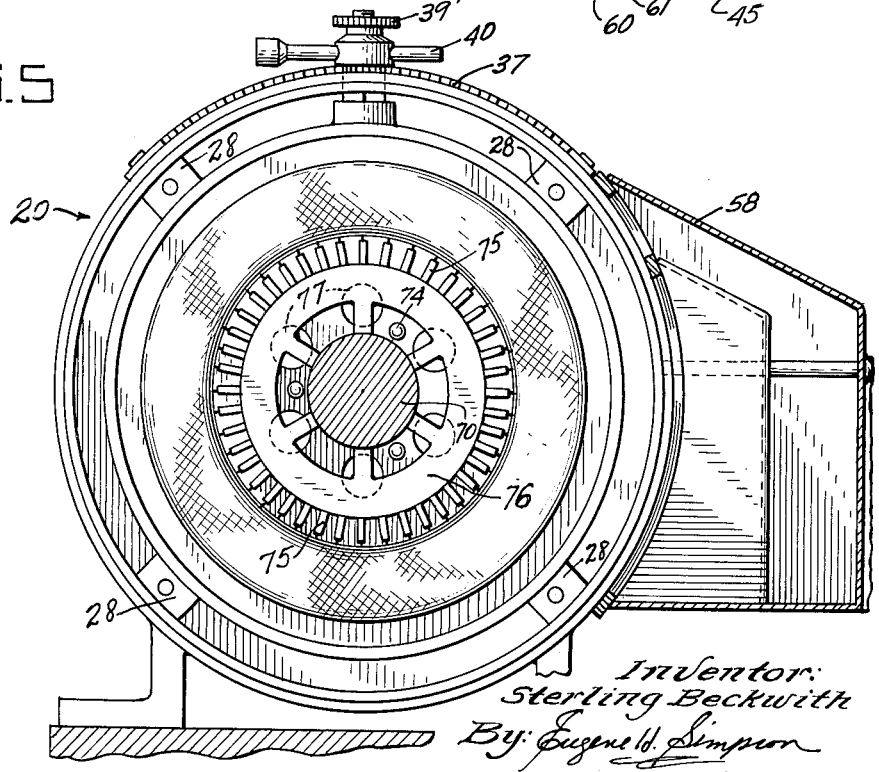

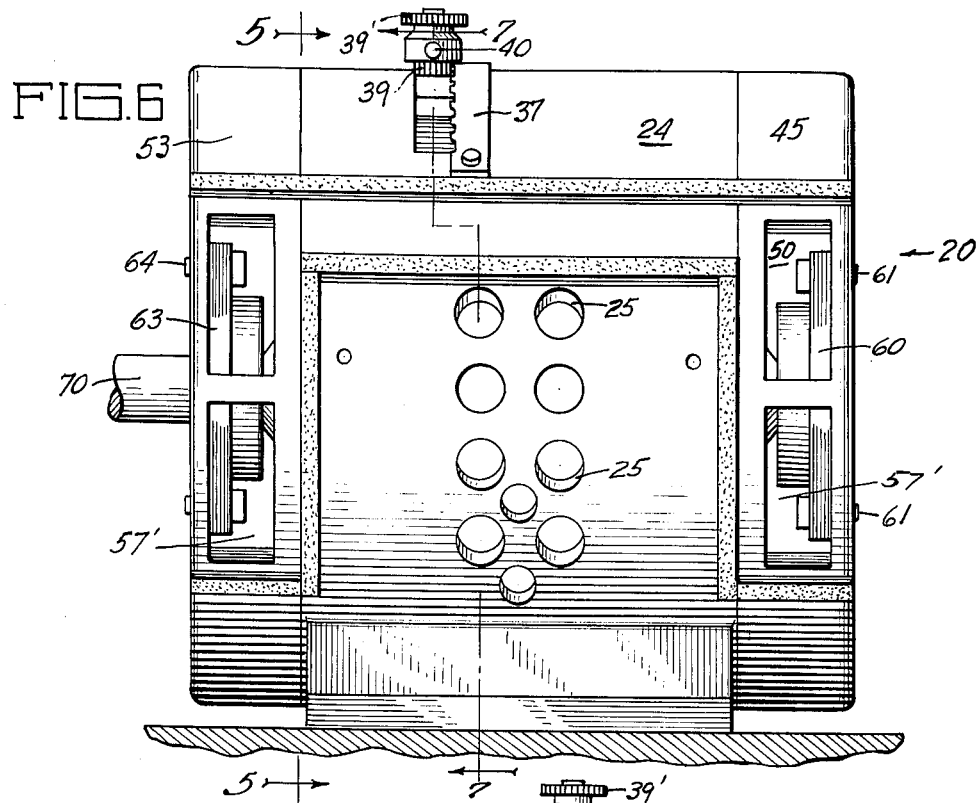
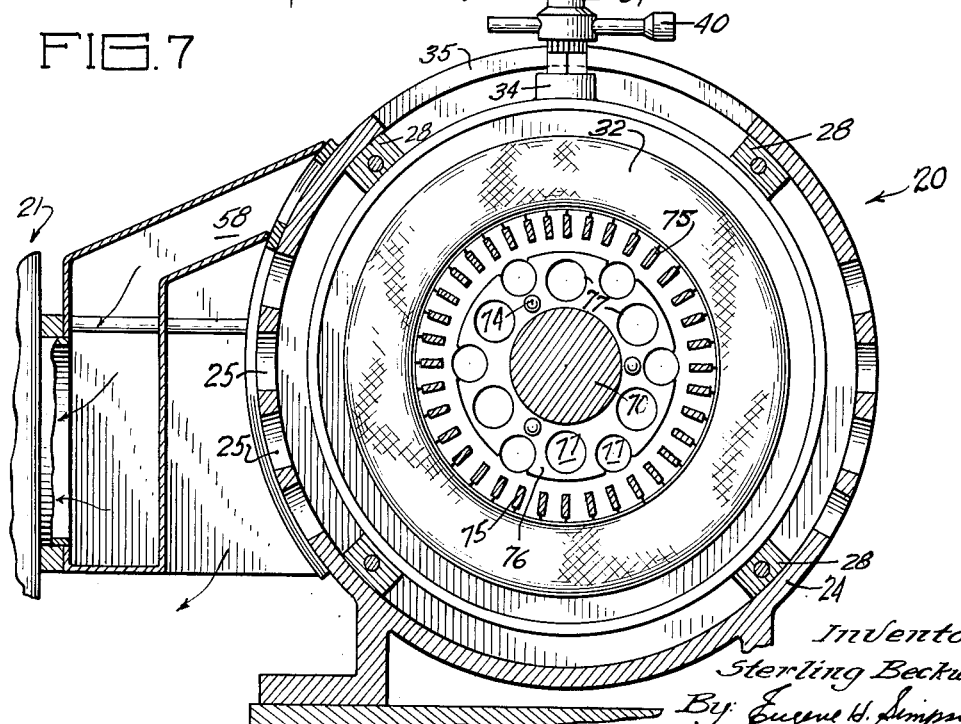

United States Patent Office 3,226,582
Patented Dec. 28, 1965

3,226,582
ADJUSTABLE TORQUE INDUCTION MOTORS
Sterling Beckwith, Libertyville, Ill.
(P.O. Box 752, Lake Forest, Ill.)
Filed Sept. 12, 1962, Ser. No. 223,194
6 Claims. (Cl. 310—59)

This invention relates to induction motors and more particularly to an induction motor which with a fixed terminal voltage can be adjusted to produce a given torque at a desired speed.

It is an object of the invention to provide a polyphase induction motor in which the speed of the motor can be adjusted to give a required horsepower.

Another object is to provide an adjustable speed squirrel cage induction motor that will not overheat under normal loading.

A further object is to provide an adjustable speed squirrel cage induction motor in which the squirrel cage may be maintained within a permissible temperature range with slip losses associated with lower speed operation.

A still further object is to provide a variable speed squirrel cage induction motor subject to a substantially constant cooling influence regardless of the speed of the motor.

A still further object is to provide a variable torque squirrel cage induction motor in which the speed may be adjusted by varying the torque characteristic of the motor.

A still further object is to provide a variable speed induction motor which will eliminate the necessity of slip rings.

A still further object of the invention is to provide a variable speed induction motor with stepless speed control.

A still further object is to provide a variable speed motor which does not require external resistors to accomplish changes in speed.

A still further object is to provide exposed rotor bars and end rings to obtain adequate unobstructed exposure to a cooling air stream.

Still further objects will become apparent upon considering the following specification which, when considered with the accompanying drawings, illustrates a preferred form of the invention.

In the drawings:

FIG. 1 is a plan view of the complete motor showing the motor with its cooling system, parts thereof being shown in horizontal cross-section to more clearly illustrate certain other parts;

FIG. 2 is a vertical transverse cross-section taken on the line 2—2 of FIG. 1, looking in the direction of the arrows, and showing the air passages to the suction side of the cooling pump;

FIG. 3 is a cross-section taken on the line 3—3 of FIG. 4, looking in the direction of the arrows, and showing the control for the adjustable stator;

FIG. 4 is a top plan view of the motor with one corner thereof being broken away to more clearly illustrate the flow of the air therethrough;

FIG. 5 is a transverse cross-section taken on the line 5—5 of FIG. 6, looking in the direction of the arrows;

FIG. 6 is a side elevational view of the motor with the air ducts removed; and

FIG. 7 is a transverse cross-section taken on the line 7—7 of FIG. 6, looking in the direction of the arrows.

Referring to the drawings and more particularly to FIGS. 1 and 2, the prime mover comprises a variable torque squirrel cage induction motor, generally designated 20, and a centrifugal blower 21 driven by a constant speed electric motor 23 which drives the blower independently of the motor 20.

The motor 20 comprises a cylindrical casing 24 containing apertures 25 for purposes of ventilation (to be described below).

A plurality of spacer lugs 28 (preferably four to a set) are secured in the cylindrical casing 24 and extend substantially the length of the casing 24 and are fixed permanently in the interior of the casing.

A physically fixed stator 30 wound for a three-phase current to produce a rotating magnetic field is secured in fixed position on the lugs 28 at one end of the casing 24. A second rotatable stator 32 containing identical magnetic circuits is mounted within the lugs at the opposite end of the casing 24, the lugs 28 supporting the stator 32 and serving as a bearing to permit limited physical rotation of the stator 32 relative to the fixed stator 30.

The rotatable stator 32 is made to rotate through an angle of 90° (for a four-pole motor) by means of a stub shaft 34 welded to the exterior ring on which the stator 32 is formed. The stub shaft 34 which contains a threaded end, projects through a ninety-degree (90°) slot 35 (FIG. 4) in the top of the motor casing 24 and past a rack 37. The rack is curved to the radius of the exterior of the casing 24, as shown in FIGS. 3, 5 and 6, with the teeth of the rack projecting over the edge of the slot 35 to be engaged by the teeth of a pinion 39 carried by the stub shaft 34. The pinion is secured on the stub shaft by means of a nut 39' and may be turned to move the stator 32 by means of a handle 40.

The rotation of the stator 32 may be accomplished also by other means to control the motor automatically to give either any desired speed or any desired torque.

A cup-shaped end cover 45 is provided for the end of the casing 24 adjacent the fixed stator 30. The cover 45 is provided with an air baffle 47 which is held in a fixed position spaced from the bottom of the cup-shaped cover 45 by means of spacer sleeves 46 and screws 46', to define an air chamber 50. A central aperture 51 in the baffle 47 provides for entrance of air from the motor casing 24 to the chamber 50.

A second cup-shaped end cap 53 is secured on the end of the casing 24 adjacent the stator 32, and contains a baffle 54 similar to the baffle 47 and secured in the cup-like cap 53 in a similar manner. As did the baffle 47, the cap 53 and the baffle 54 define a second air chamber 55 with a central aperture 56 in the baffle 54 forming an entrance for air to the chamber 55.

Air is drawn out of the air chambers 50 and 55 through elongated apertures 57'—57' in the sides of the cup. The air so drawn from the interior of the casing, through the chambers 50 and 55 then enters a twin duct 58, passes through the duct 58 and enters the intake or low pressure opening to the centrifugal fan 21. The air then passes through the fan and is discharged to the atmosphere through the outlet 80.

The end cap 45 supports an end or thrust bearing 60 which is secured to the inner surface of the cap 45 by machine screws 61.

The end cap 53 carries a bearing 63, which is secured in the bottom of the cap by machine screws 64.

The main shaft 70 of the motor extends axially through the center of the motor, is carried by the bearings 60 and 63 and projects outwardly past the cap 53.

The shaft 70 contains a pair of twin rotors 71–72, one rotor being mounted within each of the stators 30–32. The rotors are each constructed on a laminated core 73 mounted on the shaft and spaced from each other, leaving an air space therebetween. The laminations are secured together by bolts 74. The periphery of each of the cores of the rotors 71–72 have spaced, axially extending slots, the slots in rotor 71 aligning with corresponding slots in the rotor 72, with conductor bars 75 fitting within the slots and extending across both rotors and across the air gap between the cores.

The conductor bars preferably are insulated with fiber glass or other heat resisting material so as to protect the motor from excessive heat.

The ends of the conductor bars extending beyond the outside ends of the cores are joined permanently by conductor rings 76—76 so as to complete the circuits through the rotor.

The interior of the cores of the rotors 71–72 within the conductor bars 75 is supplied with longitudinal apertures 77 which permit air entering the air space between the rotors and within the bars to pass axially outwardly in both directions through the openings 51–56 in the baffles 47 and 54 respectively, and into the air chambers 50 and 55, permitting the cool air from outside to maintain the core of the rotors cool, and to carry heat away from the rotor without the air passing over the stator.

Operation

When the motor is started, with both stators 30 and 32 alined, the magnetic fields are also alined or in phase, and any conductor which cuts the magnetic field cuts alined poles in the two stators, and each of the fields builds up voltage in each conductor. Thus the current flowing in each conductor is the sum of the voltage generated in that conductor by the two stators.

Similarly, when the rotatable stator 32 is rotated physically, relative to the stationary stator 30, a certain portion of the magnetic field of the rotary stator is reversed, causing opposing E.M.F.'s to be set up in the conducting bars passing through that portion of the field. The opposing E.M.F.'s reduce the current flowing in the bars so affected and decrease the driving force of those bars and thus the net torque delivered by the motor.

As the power available is reduced to handle a given load, the speed is reduced correspondingly. Thus variations in speed may be attained by varying the phase relationship of the two stators.

In order to reduce the temperature rise due to the slip losses the present invention provides the forced draft ventilating system including the centrifugal blower 21 acting as a suction fan and driven by the independent auxiliary motor 23.

The blower 21 draws cool air from the atmosphere through the apertures 25 and into the cylindrical motor casing 24 between the twin stators 30 and 32. A portion of the air drawn into the casing is drawn into the central portion of the rotor, from whence it moves axially in opposite directions through the apertures 77 in the twin rotor cores 73 through the aperture 51 in the baffle plate 47 or through the aperture 56 in the baffle 54 and into either the air chamber 50 or 55.

The remainder of the air drawn into the casing 24 through the apertures 25 is drawn axially both around the stators 30 or 32 or along the air gap between the stator 30–32 and the rotor 71–72 and into the chamber 50–55. Air is drawn outwardly from the chambers 50–55 through the openings 57'–57' into the twin air ducts 58—58 around the apertures 25 and into the inlet of the centrifugal fan 21 and is discharged through the discharge duct 80 to the atmosphere.

It will be noted that the motor 23 being a constant speed motor and independent of the prime mover 20 supplies a constant volume of air through the prime mover regardless of the speed at which the prime mover is set to rotate.

Having thus described the invention it will be realized that the drawings illustrate merely a preferred form of the invention and that various changes in size, shape and arrangement of parts may be made without departing from the spirit of the invention or the scope of the subjoined claims.

That which is claimed as new and is desired to be secured by United States Letters Patent is:

1. In an induction motor of the character described, a pair of axially alined stators spaced from each other, a pair of spaced rotor cores, one of said cores being positioned within each of said stators with an air gap therebetween, each core having a plurality of apertures axially therethrough, a plurality of conductor bars mounted in and extending across both of said cores to define a cylindrical cage therebetween, and fan means driven independently of said motor to draw air from between the stators into said cage and through the apertures in both said rotors in opposite directions and through both said air gaps to effect cooling of said motor.

2. In an induction motor of the character described, a cylindrical casing having a plurality of openings therethrough, a pair of spaced stators mounted one adjacent each end of said casing, a double rotor mounted within both of said stators, said rotor including a core within each of said stators with an air gap between the stators and rotors each core having a plurality of axially extending apertures therethrough and conductor bars, each conductor bar extending across both said cores and the space between the cores, and a single means to draw air entering the casing through the conductor bars and simultaneously, outwardly, in opposite directions through the apertures in both cores, through both gaps and around the exterior of both stators.

3. An induction motor of the character described comprising, a cylindrical casing having a plurality of openings therethrough, an end cap having an opening in one side thereof, said cap forming a closure for one end of said casing, a second end cap having an opening through one side thereof, said cap forming a closure member for the opposite end of said casing, an annular baffle plate mounted in each of said caps adjacent said casing, said baffle plates defining, with their respective caps, an air collection chamber, a pair of stators mounted concentrically in and spaced from the sides of said casing, and from each other to form an air entrance chamber for cool air, a drive shaft for said motor mounted in said end caps and concentrically with said stators, a pair of spaced rotor cores mounted on said shaft and in alinement with said stators, conductor bars carried by and extending across both of said cores, and terminating adjacent the opening in the annular baffles, said rotor cores having longitudinally extending apertures through the cores opening into the opposite air collection chambers and means to draw air into the air entrance chamber and the space between the rotor cores and simultaneously outwardly in opposite directions around both sides of the stators and through the apertures in the rotor cores and discharge it to the atmosphere.

4. An induction motor of the character described comprising, a cylindrical casing having a plurality of openings therethrough, an end cap having an opening in one side thereof, said cap forming a closure for one end of said casing, a second end cap having an opening through one side thereof, said cap forming a closure member for the opposite end of said casing, an annular baffle plate mounted in each of said caps adjacent said casing, said baffle plates defining, with their respective caps, an air collection chamber, a pair of stators mounted concentrically in and spaced from the sides of said casing, and from each other to form an air entrance chamber for cool air, a drive shaft for said motor mounted in said end caps and concentrically with said stators, a pair of spaced rotor cores mounted on said shaft and in alinement with said stators, conductor bars carried by and extending across both of said cores, and terminating adjacent the opening in the annular baffles, said rotor cores having longitudinally extending apertures through the cores opening into the opposite air collection chambers and means to draw air into the air entrance chamber and the space between the rotor cores and simultaneously outwardly in opposite directions around both sides of the stators and through the apertures in the rotor cores through both of said air collection chambers and discharge it to the atmosphere.

5. An induction motor of the character described comprising, a cylindrical casing having a plurality of openings therethrough, an end cap having an opening in one side thereof, said cap forming a closure for one end of said casing, a second end cap having an opening through one side thereof, said cap forming a closure member for the opposite end of said casing, an annular baffle plate mounted in each of said caps adjacent said casing, said baffle plates defining, with their respective caps, an air collection chamber, a pair of stators mounted concentrically in and spaced from the sides of said casing, and from each other to form an air entrance chamber for cool air, a drive shaft for said motor mounted in said end caps and concentrically with said stators, a pair of spaced rotor cores mounted on said shaft and in alinement with said stators, conductor bars carried by and extending across both of said cores, and terminating adjacent the opening in the annular baffles, said rotor cores having longitudinally extending apertures through the cores opening into the opposite air collection chambers and a suction fan to draw air into the air entrance chamber and the space between the rotor cores and simultaneously outwardly in opposite directions around both sides of the stators and through the apertures in the rotor cores and discharge it to the atmosphere.

6. An induction motor of the character described comprising, a cylindrical casing having a plurality of openings therethrough, an end cap having an opening in one side thereof, said cap forming a closure for one end of said casing, a second end cap having an opening through one side thereof, said cap forming a closure member for the opposite end of said casing, an annular baffle plate mounted in each of said caps adjacent said casing, said baffle plates defining, with their respective caps, an air collection chamber, a pair of stators mounted concentrically in and spaced from the sides of said casing, and from each other to form an air entrance chamber for cool air, a drive shaft for said motor mounted in said end caps and concentrically with said stators, a pair of spaced rotor cores mounted on said shaft and in alinement with said stators, conductor bars carried by and extending across both of said cores, and terminating adjacent the opening in the annular baffles, said rotor cores having longitudinally extending apertures through the cores opening into the opposite air collection chambers and a suction fan to draw air into the air entrance chamber and the space between the rotor cores and simultaneously outwardly in the opposite air connection chambers and a suction fan through the apertures in the rotor cores through both of said air collection chambers and discharge it to the atmosphere.

References Cited by the Examiner

UNITED STATES PATENTS

| | | | |
|---|---|---|---|
| 1,301,845 | 4/1919 | Hellmund | 310—58 |
| 1,313,102 | 8/1919 | Macmillan | 310—125 X |

FOREIGN PATENTS 277,451  12/1951  Switzerland.

ORIS L. RADER, *Primary Examiner.*

DAVID X. SLINEY, *Examiner.*